Jan. 10, 1939.     O. TAMAN     2,143,502
BICYCLE LOCK
Filed Aug. 31, 1936     2 Sheets-Sheet 2

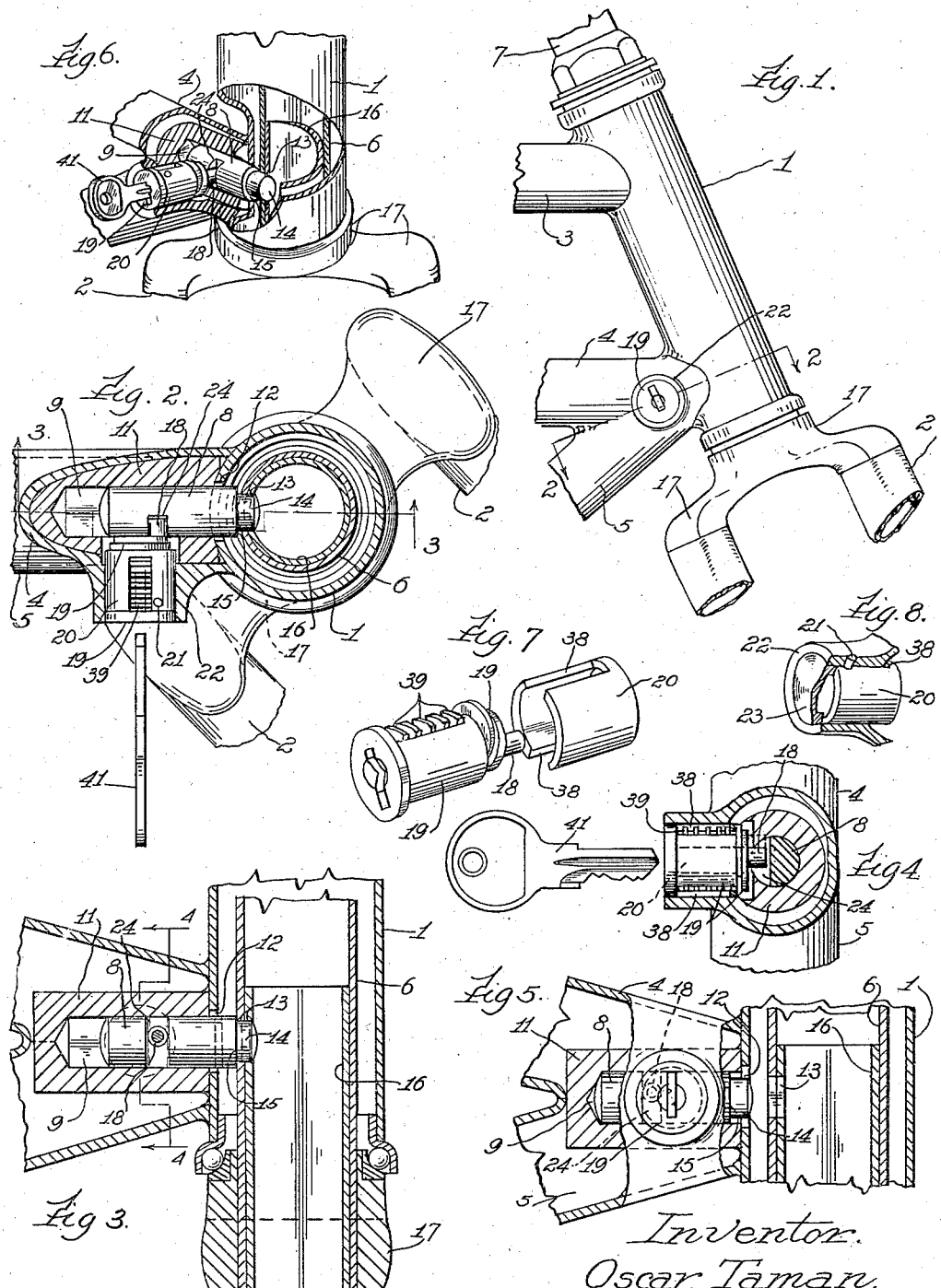

Inventor:
Oscar Taman.
by
his Attorneys.

Patented Jan. 10, 1939

2,143,502

UNITED STATES PATENT OFFICE 2,143,502

BICYCLE LOCK

Oscar Taman, Chicago, Ill.

Application August 31, 1936, Serial No. 98,647

4 Claims. (Cl. 70—233)

The purpose of this invention is to provide locking means for bicycles and like vehicles with a view to preventing the unauthorized use of the bicycle without chaining it or otherwise securing it to a fixed structure, and with this object in view the present construction involves the mounting of a sturdy and substantial cylinder lock permanently in the frame of the bicycle in combination with a bolt which may be projected by the locking mechanism into engagement with an element of the steering means, and, preferably, when the steering wheel is adjusted at a considerable angle to its normal straight-ahead position so as to make it impossible for the vehicle to be ridden and extremely difficult for it to be carried away while thus locked. It is also an object of the invention to arrange such a lock in an inconspicuous position in the vehicle without unsightly projecting parts but where it is conveniently accessible for locking or unlocking, preferably by means of a key. Other objects will appear from the description which follows. The invention thus consists in certain features and elements of construction in combination as herein shown and described and as indicated by the claims.

In the drawings:

Figure 1 is a fragmentary side elevation of the steering head and associated portions of the bicycle frame.

Figure 2 is a transverse section taken as indicated at line 2—2 on Figure 1, showing the parts of the locking mechanism housed within the frame.

Figure 3 is a vertical section taken as indicated at line 3—3 on Figure 2.

Figure 4 is a transverse detail section taken as indicated at line 4—4 on Figure 3.

Figure 5 is a vertical section generally similar to Figure 4 but showing the lock in released position.

Figure 6 is a perspective view with the parts broken away showing the lock as installed in the bicycle frame.

Figure 7 is a perspective view of a lock cylinder and its casing separated to indicate the general construction of the lock.

Figure 8 is a fragmentary perspective view showing the supporting boss of the frame and the lock casing as installed therein, with a temporary closing plug substituted for the lock cylinder.

Figure 9:
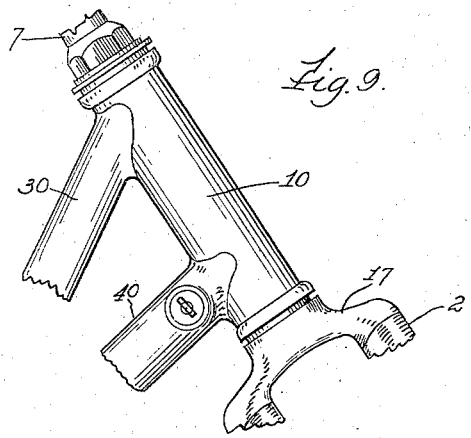
Figure 9 is a fragmentary perspective view similar to Figure 1 showing a modified arrangement of the lock in a bicycle frame.

The bicycle lock herein shown and described is adapted to be fitted into a bicycle frame in a relatively inconspicuous position and without requiring any radical alteration in the frame to prepare for it. In order to render the lock conveniently accessible it is mounted adjacent the junction of the lower end of the head, 1, in which the front wheel fork, 2, is dirigibly carried, and the lower frame member or members. In Figure 1 the frame is shown with an upper horizontal bar, 3, and a lower horizontal bar, 4, together with an inclined bar, 5. In Figure 9 the drawing shows a fragment of the type of frame employed in a woman's bicycle, in which the head, 10, has connected to it a downwardly trending upper bar, 30, and a downwardly inclined lower bar, 40. Both in the style of frame shown in Figure 1, and that of Figure 9, the locking mechanism is fitted into the lower bar or bars so as to engage with the rotatable stem, 6, of the fork, 2, at a point below the end of the handle bar stem, 7, which is telescopically secured therein. Thus the presence of the locking mechanism in no way interferes with any desired adjustment of the handle bar in the stem, 6.

Referring first to the construction shown in Figures 1 to 8, it will be seen that the locking bolt, 8, is slidably mounted in a guide bore, 9, formed in a filler block, 11, which is secured in the junction of frame members, 4 and 5, with its open end abutting the head, 1. The head is formed with an aperture, 12, which registers with the bore, 9, and the stem, 6, of the steering fork, 2, is provided with an aperture, 13, to receive the end portion, 14, of the bolt, 8, this end portion being shown as slightly reduced to form a stop shoulder, 15, which limits the protrusion of the bolt in locking position. The drawings show a tubular member, 16, fitted snugly within the hollow stem, 6, and it may be understood that this is merely a reinforcing structure, commonly included in the fork assembly for strengthening the connection of the stem, 6, to the crown, 17, of the fork, 2.

The reciprocation of the bolt, 8, into and out of locking position is accomplished by means of the crank pin, 18, on the inner end of the lock cylinder, 19, which is rotatably mounted in the slotted sleeve or casing, 20, secured fixedly, as by a pin, 21, in the boss, 22, provided at one side of the junction of frame members, 4 and 5. If desired, the slotted sleeve or casing, 20, of the lock structure may be installed in the boss, 22, in all the bicycles produced by the manufacturer, and the closure disk, 23, may be driven into the open end of the boss, 22, in lieu of the lock cylinder, 19, so that the lock may be provided as an optional feature, and may be readily installed if wanted, or may be omitted. In that event it will be understood that the bolt, 8, will be omitted from the original structure, but that it can be easily introduced into its guide bore, 9, if the stem, 6, and its connected fork are temporarily removed from the head, 1, thus permitting the bolt to be introduced through the hollow head and thence into the bore, 9. When the bolt is in place the cylinder, 19, may be slipped into the casing, 20, in the boss, 22, with its crank pin, 18, positioned to engage the transverse slot, 24, in the side of the bolt, 8, which provides the operating connection between the bolt and the lock cylinder.

Figure 10:
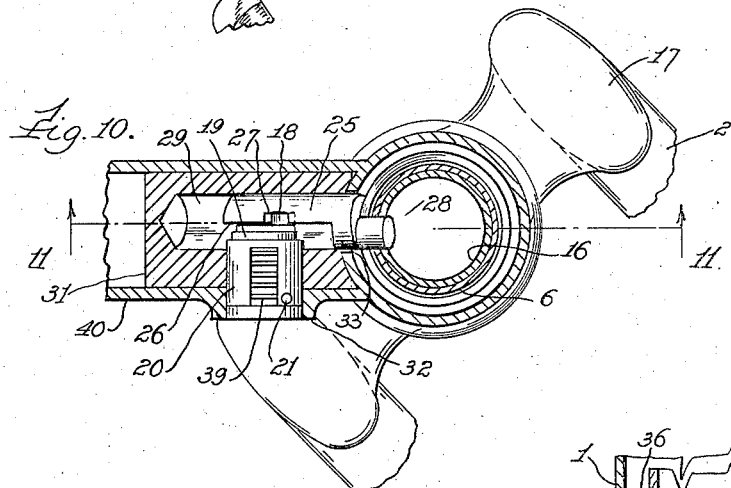
Figure 10 is a plan view partly in section of a modified form of the bolt in locking position, section being taken substantially as indicated at line 10—10 on Figure 11.

To reduce the amount by which the boss, 22, protrudes laterally from the bicycle frame, the construction may be slightly modified, as indicated in Figure 10. This shows a bolt, 25, with its shank portion cut back at one side substantially to its diametral plane so as to present a flat surface, 26, to the end of the lock cylinder, 19, with its slot, 27, engaging the crank pin, 18. In addition, the reduced head portion, 28, of the bolt, 25, is formed eccentrically thereon so that with this head portion, 28, centered at a diametral plane of the stem, 6, the body or shank of the bolt, 25, may be laterally offset within the frame by forming the guideway, 29, at one side of the middle plane of the guide block, 31. Thus the lock casing, 20, and lock cylinder, 19, may extend farther inside the bicycle frame, and the boss, 32, which accommodates the lock cylinder will protrude only slightly from the lateral plane of the tubing which forms the frame.

Figure 11:
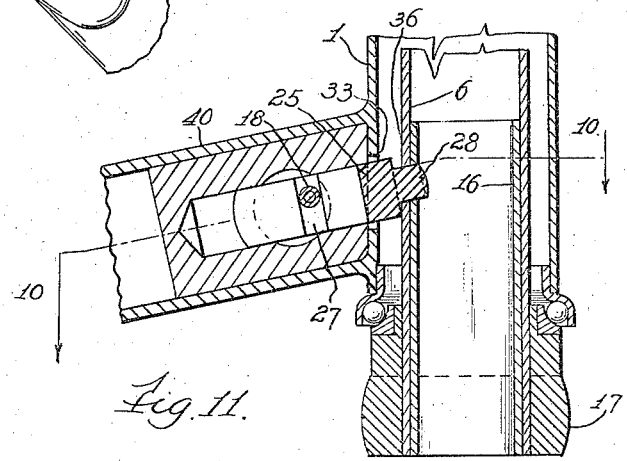
Figure 11 is a vertical section taken as indicated at line 11—11 on Figure 10.

This modified form of bolt happens to be shown in association with other modifications, but it will be understood that its use is not necessarily limited to the particular situation in which it is illustrated. Figures 9, 10 and 11 show the locking bolt mounted in a single member of the frame instead of at the junction of two members, as in Figures 1 to 6, and to illustrate this arrangement Figure 9 shows a fragment of the type of frame designed for women. This includes a tubular member, 40, sloping downwardly from its junction with the head, 10, in which the stem, 6, of the steering fork, 2, is journaled. A filler block, 31, occupies the full internal diameter of the tube, 40, and extends to the junction with the head, 1, abutting the outer surface of the head tube adjacent the opening, 33, therein, which is provided to allow the end of the bolt, 25, to be projected into the head, 1, for engagement with the locking aperture, 36, in the stem, 6. The bolt thus approaches the stem, 6, obliquely, but engages none the less effectively therewith for locking the stem and fork, 2, against turning movement. As shown in Figures 2 and 10 the fork is locked at about 45 degrees to its straight-ahead position, but it will be understood that the locked position may be at any desired angle in accordance with the judgment of the manufacturer.

As shown, the bolt is provided with no spring for urging it in either direction, but it will be seen that the cylinder casing, 20, is formed with two slots, 38, into either of which the tumblers, 39, may be projected, depending upon the position to which their cylinder, 19, is rotated. This arrangement permits the bolt to be positively secured at either limit of its movement, the lock cylinder, 19, being rotated through an angle of 180 degrees for shifting the bolt from its locking position, as shown in Figure 2, to its unlocked position, as shown in Figure 5. In accordance with familiar practice, the lock tumblers may be so arranged that they will prevent withdrawal of the key, 41, except at one or the other of these two limits of adjustment. Therefore, the user may be sure that if the key is withdrawn the bolt is positively secured either in locking position or at fully unlocked position, with no danger that the bolt will be jarred or vibrated into locking position while the bicycle is being ridden.

I claim:

1. In a bicycle lock of the type which includes a guide located inside one of the tubular frame members of the bicycle, and a bolt slidable in said guide for engagement with the stem of the steering wheel fork of the bicycle, an annular boss formed on the side of the tubular frame member adjacent said guide and bolt, providing an opening in the frame member and reinforcing said member around the opening, and a key-operated cylinder lock rotatably mounted in said annular boss and positively engaging said bolt for projecting it into locking relation to the stem.

2. In a bicycle lock of the type which includes a guide located inside one of the tubular frame members of the bicycle, and a bolt slidable in said guide for engagement with the stem of the steering wheel fork of the bicycle, an annular boss formed on the side of the tubular frame member adjacent said guide and bolt, providing an opening in the frame member and reinforcing said member around the opening, said bolt being made from cylindrical stock and having a reduced end portion eccentric with respect to its cylindrical body adapted for engagement with the said stem, and a shank portion cut away at one side of a substantially diametral plane, leaving a flat surface at said plane, together with a key-operated cylinder lock having its cylinder rotatably mounted in said annular boss with its inner end adjacent said flat surface of the bolt, said bolt having a transverse slot opening into said flat surface, and the lock cylinder having a crank pin engaged in said slot for reciprocating the bolt in the guide.

3. In a bicycle lock of the type which includes a guide located inside one of the tubular frame members of the bicycle and a bolt slidable in said guide for engagement with the stem of the steering wheel fork of the bicycle, a key-operated cylinder lock including a casing fixed in said frame member and having abutment faces at two positions in its periphery, and a cylinder rotatable in the casing and provided with tumblers engageable with said abutment faces at two corresponding positions of the cylinder for locking the cylinder against rotation in the casing at either of said positions, said tumblers being releasable from the abutments by means of a key insertable in the cylinder and the tumblers being formed to engage such key and retain it against withdrawal except when the tumblers engage the abutment faces of the casing, together with means connecting the cylinder with the bolt for shifting the latter into and out of engagement with the stem upon rotation of the cylinder, said bolt reaching its limits of movement respectively when the tumblers engage the respective abutment faces of the lock cylinder casing, whereby the key may be withdrawn only at such limits.

4. In a bicycle lock of the type which includes a guide located inside one of the tubular frame members of the bicycle, and a bolt slidable in said guide and having a head portion for engagement with the stem of the steering wheel fork of the bicycle, annular means on the side of the tubular frame member adjacent said guide and bolt, providing an opening in the frame member and reinforcing said member around the opening, and a key-operated cylinder lock rotatably mounted in said annular means, the shank portion of the bolt which is adapted to engage with the cylinder lock being offset laterally from the head portion which engages the stem of the fork, and the cylinder lock being mounted with its inner end adjacent the offset portion of the bolt and operatively engaged therewith for causing reciprocation of the bolt in said guide when the lock cylinder is rotated.

OSCAR TAMAN.